United States Patent [19]

Hutchison et al.

[11] Patent Number: 4,969,319
[45] Date of Patent: Nov. 13, 1990

[54] ENGINE/TRANSAXLE COMBINATION
[75] Inventors: Wayne R. Hutchison, Mayville, Wis.; Izumi Takagi, Akashi, Japan
[73] Assignee: Deere & Company, Moline, Ill.
[21] Appl. No.: 465,534
[22] Filed: Jan. 17, 1990

Related U.S. Application Data

[63] Continuation of Ser. No. 246,121, Sep. 16, 1988, abandoned.
[51] Int. Cl.⁵ .................... A01D 34/76; A01D 34/82
[52] U.S. Cl. ..................... 56/014.7; 56/16.9; 56/DIG. 9; 74/607
[58] Field of Search ............ 56/14.7, 16.7, 16.9, 56/DIG. 4, DIG. 6, DIG. 9, DIG. 10; 74/606 R, 607, 687, 700, 720, 730

[56] References Cited

U.S. PATENT DOCUMENTS

| | | | |
|---|---|---|---|
| 2,557,937 | 6/1951 | Buckendale | 74/607 |
| 3,122,944 | 3/1964 | Boehner et al. | 74/700 |
| 3,136,106 | 6/1964 | Joslin | 56/DIG. 10 |
| 3,150,543 | 9/1964 | Dangauthier | 74/700 |
| 3,424,032 | 1/1969 | Ritter | 74/730 |
| 3,441,106 | 4/1969 | Taylor et al. | 74/607 |
| 3,453,904 | 7/1969 | Dangauthier | 74/664 |
| 3,748,851 | 7/1973 | Hause | 60/19 |
| 4,232,569 | 11/1980 | Hauser et al. | 74/607 |
| 4,483,408 | 11/1984 | Yazaki | 180/70.1 |
| 4,609,065 | 9/1986 | Shikiya et al. | 74/607 |
| 4,633,961 | 1/1987 | Niskanen | 180/53.7 |
| 4,679,382 | 7/1987 | Saruhashi et al. | 56/14.7 |
| 4,719,815 | 1/1988 | Sherman | 74/607 |
| 4,809,489 | 3/1989 | Johansson | 56/14.7 |

FOREIGN PATENT DOCUMENTS

| | | |
|---|---|---|
| 48-22886 | 7/1973 | Japan . |
| 48-22887 | 7/1973 | Japan . |
| 53-26602 | 8/1978 | Japan . |
| 59-87324 | 6/1984 | Japan . |

OTHER PUBLICATIONS

Honda, Owner's Manual, "Riding Mower HT-R3811", (61 pages) Honda Motor Co. Ltd., 1986, printed in Japan, published in U.S.A.
U.S. patent application Ser. No. 089,146 filed Aug. 25, 1987, claims a Japanese Priority of Aug. 26, 1986. The Japanese Priority Application 202535/86 for U.S. Ser. No. 089,146 is believed to have been laid open for examination in Japan on or about Feb. 26, 1988.

Primary Examiner—Stephen J. Novosad
Assistant Examiner—Terry Lee Melius

[57] ABSTRACT

A unitized engine transaxle combination preferably having a variable speed transmission such as a hydrostatic or continuous variable transmission for utilization in a work vehicle, the combination including a specific arrangement of components parts inside the transaxle housing and the connection of the engine thereto to provide the engine transaxle combination unit. In the preferred embodiment, a hydrostatic pump is connected to the engine and the hydrostatic motor is positioned inside the transaxle housing on the same side thereof in relation to the left or right side of the combination. In close proximity to the hydrostatic motor, a speed reduction unit is also housed inside the transaxle housing. The other end of the transaxle housing houses a differential unit. The hydrostatic pump is driven by a cam gear mechanism which is contained within the engine housing and interconnects with the engine crankshaft and the hydrostatic pump input shaft so that the hydrostatic pump is driven thereby. Preferably, the engine and the transaxle are interconnected and include at least a partially common housing. The engine is positioned as close to the ground and as close to the transaxle as possible in order to lower the vehicle's center of gravity while still providing sufficient clearance between the output end of the engine crankshaft and the ground. A single belt is utilized to drive a working implement operatively connected to the vehicle from the engine output shaft to an implement input shaft. This single belt passes through a space created in the transaxle by the arrangement of the component parts as described above. The space created is sufficient to allow the vehicle to operate the implement with a maximum vertical float which occasionally, but not for extended periods exceeds the recommended manufacturer's belt misalignment angle without interference between the belt and the bottom of the transaxle housing.

18 Claims, 5 Drawing Sheets

ENGINE/TRANSAXLE COMBINATION

This application is a Continuation of application Ser. No. 07/246,121, filed Sept. 16, 1988, now abandoned.

BACKGROUND OF THE INVENTION

The present invention relates to engine/transaxle combinations used as driving means for working vehicles.

Figure 2:
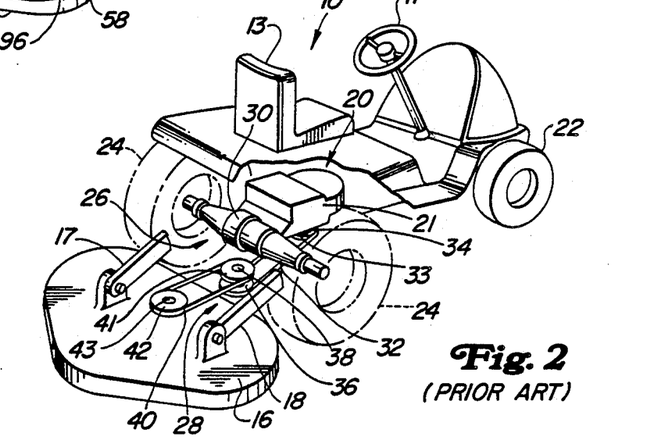
FIG. 2 is a schematic perspective view with partial cut away portions illustrating a conventional engine transaxle combination mounted on a buggy.

FIG. 2 shows a conventional working vehicle 10 equipped for lawn mowing. The conventional work vehicle 10 includes a steering wheel 11, an operator's seat 13 and a mower deck 16 or other working implement which is conventionally operatively connected to the vehicle through two traction bars 17, 18. A drive unit 20 which includes an engine 21 is positioned between the two front wheels 22 and/or two rear wheels 24. As shown, a conventional transaxle 26 is positioned on the mower deck 16 side of the rear wheels 24. Driving power is provided from the engine 21 to the mower deck 16. A V-belt system 28 is operatively positioned between the engine 21 and the mower deck 16 for transmitting power from the engine 21 to the mower deck 16 or other implement.

In the central portion 30 of the transaxle, a speed reduction unit and a differential unit (not shown) are operatively positioned in close proximity to each other, as shown in Japanese Patent unexamined publication No. 56-23065. In the conventional structure, a first V-belt 32 is provided for transmitting power between a belt pulley 33 operatively connected to the output end of the engine crankshaft 34 and a second belt pulley 36 operatively connected to an intermediate shaft 38 which is conventionally connected to the transaxle 26. A second V-belt 40 is provided for transmitting power between a third belt pulley 41 operatively connected to the intermediate shaft 28 and a fourth belt pulley 42 operatively connected to the input shaft 43 of the mower deck 16 or working implement.

With the conventional vehicles, the intermediate shaft 38 having the second 36 and third 41 pulleys is required because the relative thickness of the central portion 30 of the conventional transaxle prevents the moWer deck 16 Or other attached implements from having sufficient operational vertical movement or float relative to the work vehicle. Therefore, utilizing a single V-belt between the engine output shaft 34 and the input shaft 43 of the work implement to transmit power is not practical because the conventional intermediate shaft 38 with pulleys provides the ability for the V-belt connecting the intermediate shaft and the implement to float vertically in response to convex or concave conditions in the operating surface without interference between the belt and the conventional thick transaxle housing. Specifically, as shown, with the intermediate shaft 38, if the mower deck 16 is moved vertically, the second V-belt 40 will move vertically, but the first V-belt 32 will not move vertically. Therefore, with this conventional construction, the central thick portion 30 of the transaxle is prevented from contacting or interfering with the first V-belt 32.

However, in the above described conventional structure the distance between the intermediate shaft 38 and the implement input shaft 43 is relatively short and the second V-belt 40 will reach its maximum acceptable belt misalignment angle (+/- 5°-8°) for extended operations with rather limited vertical movement of the mower deck 16 when compared to the vertical movement possible by utilizing a longer belt. Thus, because of the conventional transaxle structure, two belts and an intermediate shaft and pulleys are required resulting in increased cost and complexity, not to mention the restricted vertical float. Further the conventional two belt system is apparently subjected to increased bending frequency thereby resulting in reduced service lives for the V-belts.

In order to increase the actual vertical float distance, it appears necessary to increase the distance from the engine output shaft pulley to the implement input shaft pulley in order to increase the distance above and below the normal level implement position which the implement can float. This is due to the acceptable belt misalignment angle mentioned above. Specifically, as the distance between the engine output crankshaft pulley and the implement input pulley decreases, the smaller the distance above and below the normal level implement position the implement can float without exceeding the belt misalignment angle. Because with the conventional pulley and belt system utilized to transmit power from the engine output crankshaft to the implement input shaft having two pulleys and an intermediate shaft, the conventional system is restricted relative to the belt's misalignment angle above and below the implement level plane. In other words, the shorter the distance of any one belt, the less the distance the implement can deviate from both above and below the level implement position without exceeding the belt misalignment angle.

With the conventional structure, the intermediate shaft is required partially because the engine crankshaft and the transaxle centerline have been separated by such a relatively great distance. Therefore, utilization of one belt for transmitting power from the engine output shaft to the implement input shaft was impractical. Specifically, even if there were sufficient clearance between a single belt and a lower portion of the transaxle housing to enable the belt to pass thereunder and to allow some vertical float, since the distance separating the engine crankshaft and the transaxle housing was relatively great, the vertical float angle provided at the engine crankshaft pulley was less in the vertical direction than the belt misalignment angle due to interference between the belt and the bottom portion of the transaxle.

An additional problem encountered with conventional engine transaxle arrangements during the development of the present invention involved how you assemble the engine and transaxle into a unit while maintaining an acceptable vehicle center of gravity simultaneously with an acceptable clearance between the bottom of the engine output shaft and the ground. With the engine and the conventional transaxle configured as a unit, the vehicle center of gravity was too high for use in front mount mower-type vehicles and the conventional hydrostatic transaxle drive arrangement whereby the hydropump was conventionally driven by the engine crankshaft provided inadequate ground clearance for the engine crankshaft.

With conventional engine transaxle configurations, having hydrostatic transmissions, separate lubricating systems have been used to separately lubricate the engine, the differential and to provide hydraulic fluid for the hydrostatic transmission. If the hydrostatic fluid system and the engine lubricating fluid system along with the transaxle system could be interconnected, a simpler, more serviceable unit would result.

Accordingly, there is a need for an improved engine transaxle combination which eliminates the intermediate shaft and the two pulleys; which provides adequate clearance so that a single V-belt can be connected directly between the engine output shaft and the mower deck or other working implement input shaft; which positions the engine relatively close to the transaxle center line thereby decreasing the distance from the engine output shaft to the implement input shaft while simultaneously maintaining an acceptable vehicle center of gravity; which shortens the engine output shaft so that adequate ground clearance is maintained; which utilizes the engine crankshaft to drive the hydropump from a location inside the engine; which eliminates interference between the single V-belt and the transaxle housing; which provides for increased vertical implement float; which provides for reduced cost in both material and assembly labor; which simplifies the connection between the engine output shaft and the mower deck or other working implement; which provides for common fluid between the engine and at least one other of the hydrostatic transmission, the differential, and/or the axle.

SUMMARY OF THE INVENTION

The present invention is an improved engine transaxle combination which, among other features, provides for directly connecting the engine crankshaft and the input shaft to an input shaft of a mower deck or other working implement with a single V- belt means while still allowing adequate vertical belt movement without interference with the transaxle and for arranging the components of a hydrostatic transmission, engine and transaxle in combination so that an acceptable vehicle center of gravity and an acceptable clearance between the engine output shaft and the ground are simultaneously provided.

In the preferred embodiment of the engine/transaxle unit, a single V-belt connects the engine output shaft and the implement input shaft and passes under the transaxle without interfering with the transaxle through the entire range of implement vertical float. This direct connection between the engine output shaft and the implement input shaft is made possible by the disclosed configuration of the engine and transaxle combination and by the arrangement in the transaxle housing of certain component parts of the hydrostatic transmission and the transaxle including the hydromotor, a speed reduction gear unit and a differential unit.

In the preferred embodiment, a portion of the transaxle housing is utilized as an integral portion of the engine to comprise a unitized engine transaxle. However, it should be noted that the advantages provided by the present invention do not require that the engine and the transaxle have a common housing only that the various component parts be positioned so that the advantages of the combination are accomplished without regard to the particular manner in which the various components are assembled together.

For example, an important feature of the present invention includes the relative physical positioning of the engine to the transaxle and whether they are merely operatively connected together by connection means such as bolts, rivets, welded etc. or whether part of the engine is assembled into a portion of the transaxle housing itself is immaterial.

An additional important aspect of the present invention includes the lowering of the vehicle's center of gravity by positioning the engine crankshaft as close to the center line of the axle as possible and by lowering the engine relative to the axle's center line while maintaining adequate clearance between the engine output shaft and the ground. Specifically, adequate output shaft ground clearance is maintained by driving the hydropump, which is attached to the exterior of the engine by a gear mechanism located inside the engine, by the engine cam shaft.

An even further aspect of the present invention includes the utilization of common fluid between the hydrostatic transaxle, the reduction gear and the differential gear of the transaxle.

A still further aspect of the present invention includes the utilization of common fluid to lubricate the engine and as hydraulic fluid for the hydrostatic transmission, the axle and/or as lubrication for the differential.

Accordingly, objects of the present invention include: to provide an improved work vehicle having an engine transaxle arrangement which utilizes a single V-belt to transfer power from the engine to a work implement; to provide an internal transaxle component parts arrangement which facilitate the direct linkage of the engine output shaft with the implement input shaft via a single V-belt; to provide a component parts arrangement which allows a common fluid for engine lubrication, hydraulic fluid for the hydrostatic transmission, and/or lubricating fluid for the speed reduction gear, and the differential of the transaxle unit; to provide an engine transaxle combination simultaneously having a low center of gravity and adequate clearance between the engine output shaft and the ground; and to provide a preferred unitized engine transaxle combination having a common partial housing member for both the engine and the transaxle.

Other objects and advantages of the invention will be apparent from the following description, the accompanying drawings and the appended claims.

DESCRIPTION OF THE PREFERRED EMBODIMENT

Figure 1:
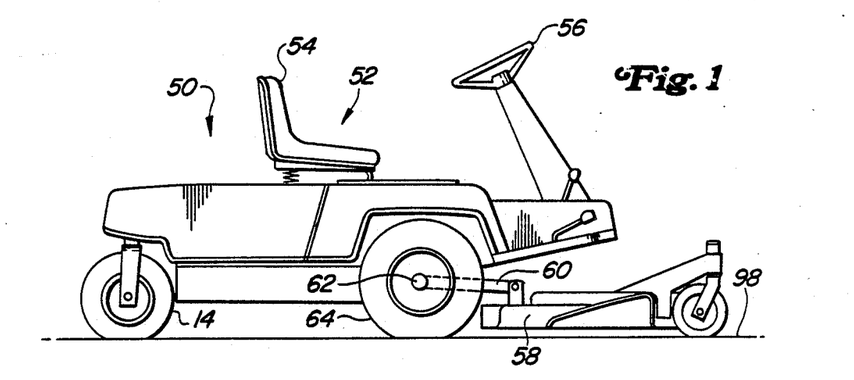
FIG. 1 is a side view of a front mount mower incorporating the combination engine transaxle of the present invention.
Figure 3:
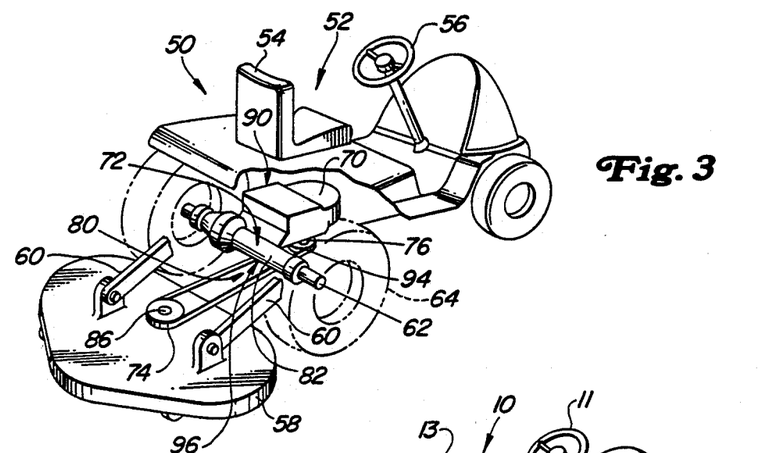
FIG. 3 is a schematic perspective view with cut away portions illustrating the utilization of the present invention as would be mounted on the buggy of FIG. 2.

As shown in FIGS. 1 & 3, the preferred embodiment of the present invention can be utilized on a front mount mower as illustrated in FIG. 1 or on a rear movement mower as illustrated in FIG. 3. For purposes of discussion herein, the same numbers will be utilized for the similar parts of each version illustrated in FIGS. 1 and 3. Each figure illustrates a mower 50, having an operator's station 52 including an operator's seat 54 and a steering wheel 56. A mower deck 58 is operatively connected to each vehicle by a pair of connection members 60 for swinging movement about a transverse axis 62. The preferred embodiment of the invention includes an engine/transaxle combination 90 (FIG. 4) which is assembled into a unit having at least a common partial housing member, but which can utilize connected separate housing members for the engine and the transaxle. As shown, in FIGS. 1 and 3-6 the axle of the mower 50 is utilized to power or drive the wheels 64, therefore, the engine 70 and transaxle 72 are preferably located underneath the operator's station 52.

In order for the mower deck 58 to be driven by a single V-belt 74 connected with the engine crankshaft 76, clearance means 80 must be provided for allowing the V-belt 74 to pass from the engine crankshaft 76 and underneath the transaxle housing 82 to the input shaft 86 of the mower deck 58 (see FIG. 3). This clearance 80 must be sufficient to allow the mower deck 58 to have adequate vertical float such that the transaxle housing 82 does not contact or operationally interfere with the V-belt 74 during the transfer of power from the engine crankshaft 76 to the mower input shaft 86.

To accomplish this, as shown in FIGS. 3-6, the engine/transaxle combination 90 of the present invention is assembled together with the engine crankshaft 76 being vertical and positioned close to the axle center line 92 so that the pulley 94 (FIGS. 3 and 4) on the engine crankshaft 76 is as close to the transaxle housing 82 as possible. This arrangement minimizes possible interference between the belt 74 and the lower portion 96 of the transaxle housing 82 as the mower 58 floats over uneven terrain.

To provide a low vehicle center of gravity while still maintaining adequate clearance between the pulley 94 and the ground 98 (see FIG. 1), the engine 70 is connected to the transaxle 72 as close to the ground 98 as practical.

In order to provide adequate clearance for the V-belt 74 under the transaxle housing 82, the differential unit 100 is positioned inside and to one side of the transaxle housing 82 at a location preferably proximate the right front wheel of the mower vehicle 50. In vehicles equipped with hydrostatic transmissions (see FIG. 5), the hydromotor 104 is also preferably operatively positioned inside the transaxle housing 82 to one side and at a location proximate the left front wheel of the vehicle. A speed reduction gear 108 is operatively positioned inside the transaxle housing 82 proximate the hydromotor 104. The specific locations of the differential 100, the hydromotor 104 and the speed reduction gear 108 can be varied within the transaxle housing 82 according to specific requirements, it being understood that other arrangements of the various sub-component parts can be placed in other positions than those illustrated and still be within the scope of the present invention.

In particular, one critical aspect of the present invention is the amount of clearance required by the V-belt 74 which connects the engine crankshaft 76 with the input means on the mower deck 58. In FIGS. 1 and 3, the mower deck 58 is shown operating on a level surface. The V-belt 74 mounted between the engine crankshaft 76 and the mower deck input shaft 86 (see FIG. 3) is shown in its normal level operating position. However, when the mower deck 58 is caused to move either above or below the level position shown, such as when encountering rough or uneven terrain, the mower deck 58 and the belt 74 connected thereto deflect either upwardly or downwardly from the level position of the engine pulley 94. Since most belt manufacturers recommend only a 5° belt misalignment angle from the level position, i.e. as the belt exits the pulley, the greater the vertical distance between the pulley 94 carried by the engine crankshaft 76 and the implement input shaft 86, the greater the belt deflection. Thus, there is a requirement that there be adequate clearance 80 between the V-belt 74 and the lower portion 96 of the transaxle housing 82 to prevent the transaxle housing 82 from interfering with V-belt operation. This clearance 80 is obtained by the arrangement of the various sub-components within the transaxle housing 82 and the transaxle configuration which accommodates the V-belt deflection.

Another consideration in the location of the various sub-components in the transaxle housing 82 is the fluid flow from the engine sump 110 (see FIGS. 5 and 6) to the hydropump 112, the hydromotor 104 and back to the hydropump 112. Leakage from this fluid flow system is preferably utilized to lubricate the speed reduction gear 108 and/or the differential 100. After lubrication of the speed reduction gear unit 108 and/or the differential unit 100, the fluid is returned to the engine fluid sump 110.

Figure 4:
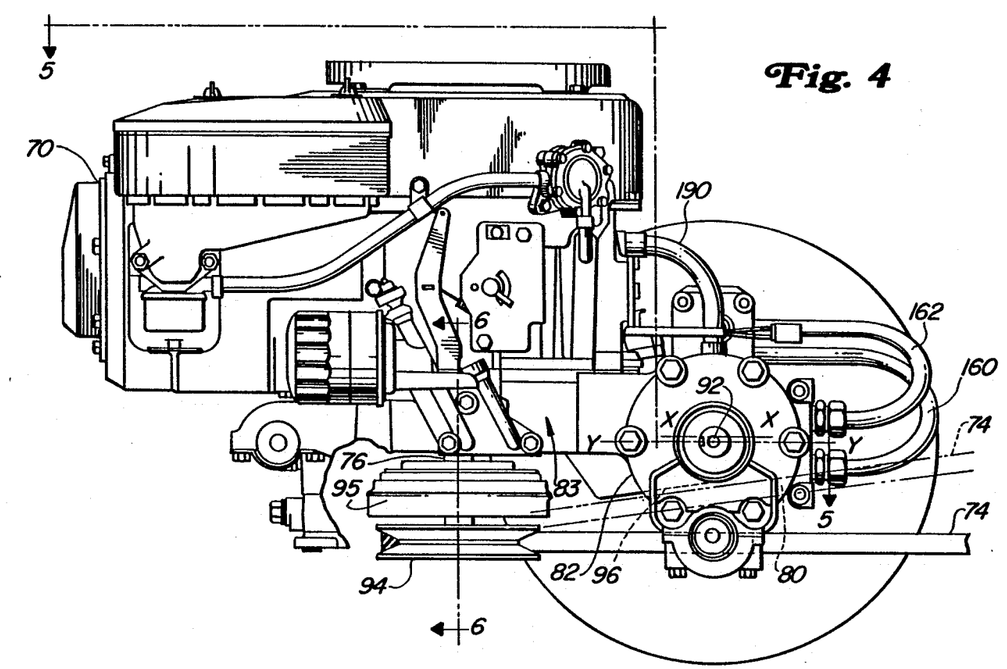
FIG. 4 is a side view with portions cut away of the engine of one embodiment of the engine transaxle combination of the present invention.
Figure 5:
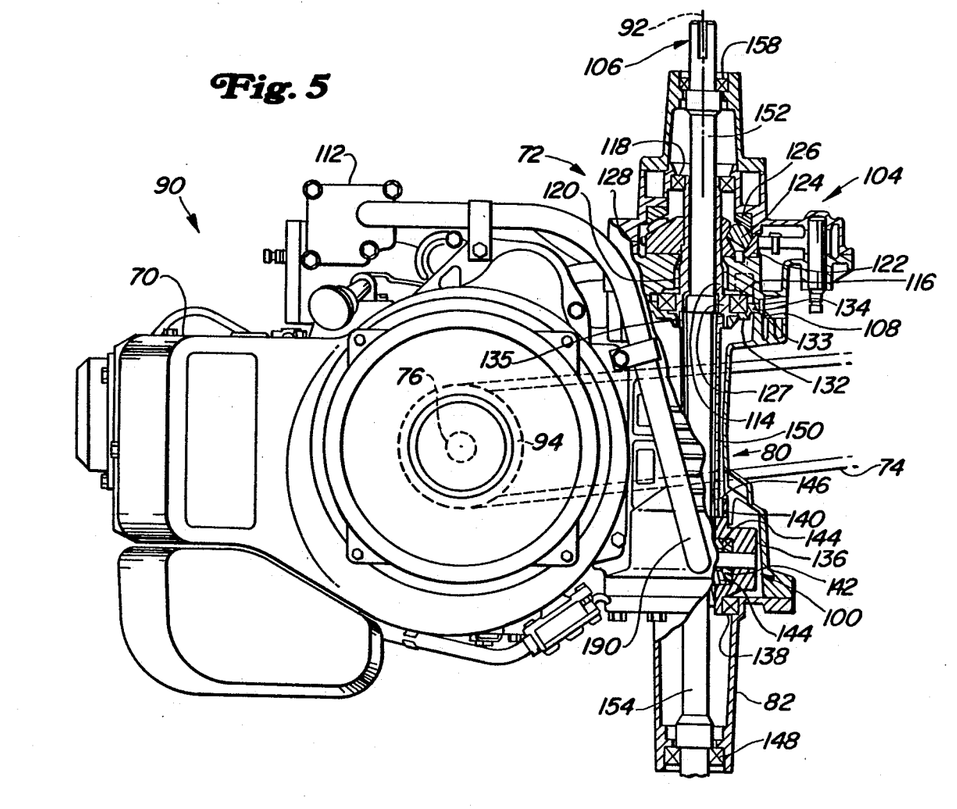
FIG. 5 is a plan view of the engine with portions of the transaxle housing removed showing the internal arrangements of the various components.

In order to provide for the above, the following component parts combination was determined as being one of a plurality of possible combinations which might be satisfactory. As shown in the preferred embodiment FIGS. 1 and 3-6, the preferred engine transaxle combination 90 includes a tubular transaxle housing 82 operatively connected to the engine 70. The transaxle housing 82 preferably includes at least a portion 83 which partially encases the engine 70 (see FIG. 4). As shown in FIG. 5, the hydromotor 104 is positioned within the transaxle housing 82 along with the speed reduction unit 108, the differential unit 100 and the axle 106 itself.

The hydraulic motor 104 includes a hollow axle carrier 114 which is rotatably supported at its ends by ball bearings 118 and needle bearings 120. An eccentric circular sleeve 127 is formed at one end of the carrier 114. A disk-shaped cylinder block 122 is slidably engaged with splines formed in the outer periphery of the carrier 114. A plurality of pistons 124 are equiangularly provided in a conical surface of the cylinder block 122. A thrust plate 126 is provided for receiving thrust from the pistons 124 which are rotatably supported within the axial housing 82, so that the thrust plate 126 may rotate in a forward direction or a reverse direction. The cylinder block 122 is used as a brake drum, therefore, a band brake 128 is provided around the cylinder block 122 to serve as the brake mechanism.

In order to supply power for operating the hydraulic motor 104, a variable hydraulic pump 112 is operatively positioned on the engine 70 and is driven by a cam shaft mechanism 130 (see FIG. 6) which is operatively positioned inside the engine and operatively connected with the crankshaft 76.

Figure 6:
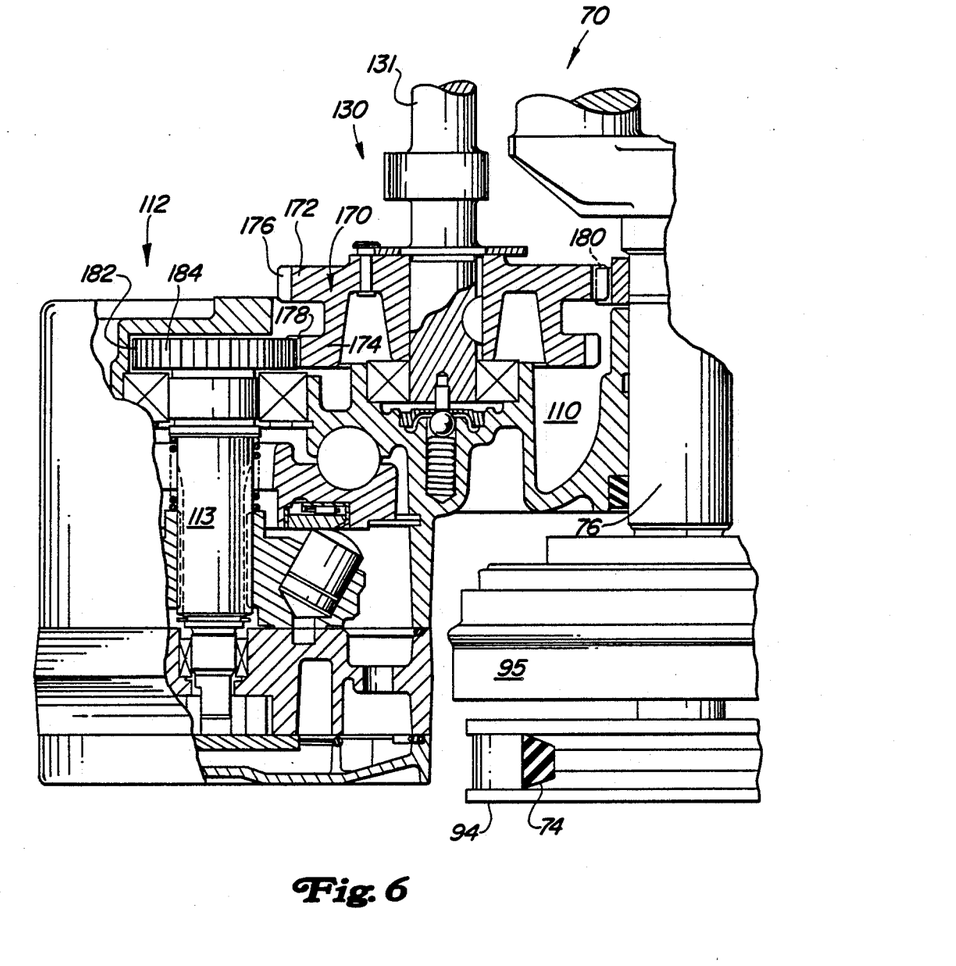
FIG. 6 is a view taken along line 6—6 of FIG. 4.
Figure 7:
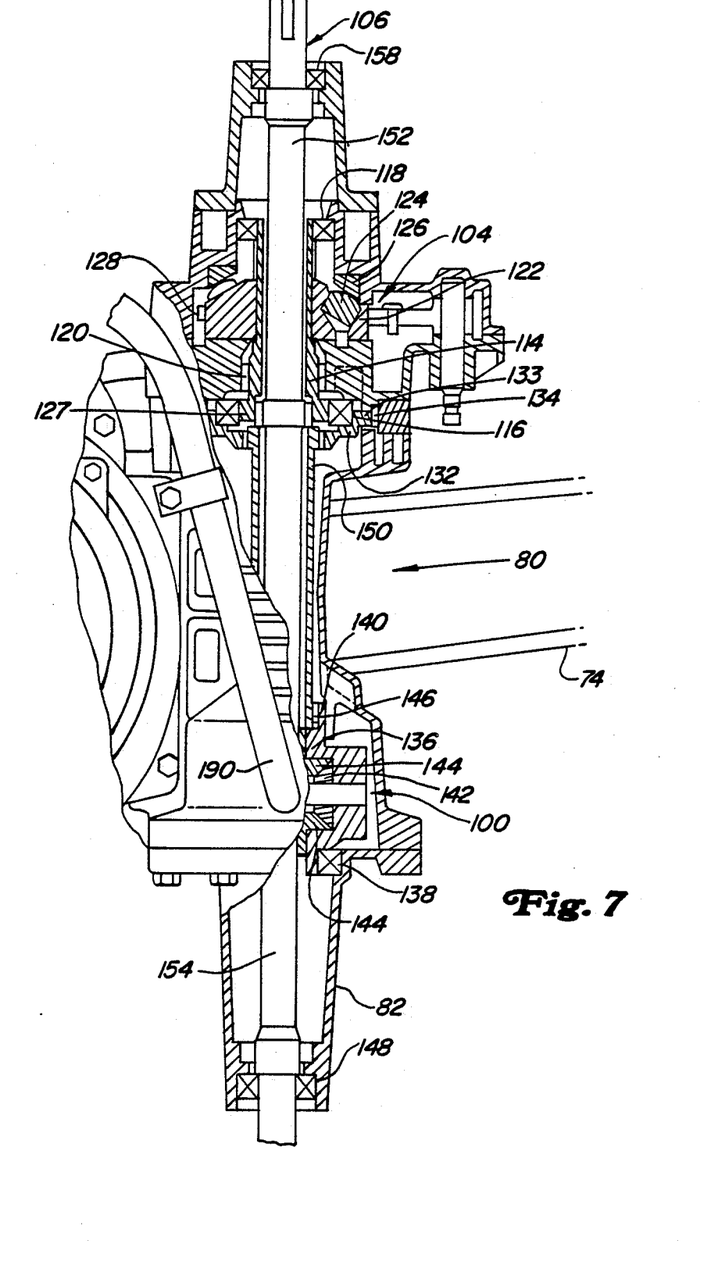
FIG. 7 is an enlarged view of the transaxle combination illustrated in FIG. 5.

This particular arrangement is important to the overall success of the combination. Specifically by positioning the hydropump 112 on the exterior of the engine 70 and by driving it by a cam shaft gear system positioned inside the engine, the engine could be connected to the transaxle 72 at a position relatively closer to the ground than before. This relatively lower positioning provides for a vehicle with a lower center of gravity, thereby improving stability and also reducing the length of the crankshaft 76 which extends from the bottom of the engine 70.

Through reducing the horizontal distance between the engine crankshaft 76 and the transaxle housing 82, the vertical distance through which the belt 74 swings beneath the lower portion 96 of the transaxle housing 82 was reduced, thereby increasing the distance the front mounted implement could move above a level position relative to the engine pulley 94 without having the lower portion of the transaxle housing 82 interfere with or contact the belt 74.

As shown in the plan view of FIG. 5, the hydropump 112 is preferably operatively connected to the left lower side portion of the engine 70 of the preferred unitized engine-transaxle combination 90. As shown in FIG. 4, two fluid lines 160, 162 are utilized in fluid communication between the hydropump 112 and the hydromotor 104, one line for flow in each direction therebetween, depending upon whether the vehicle is operating in the reverse or the forward direction. Further details of the unitized engine transaxle configuration related to the present invention can be found in U.S. Ser. No. 161,026, filed Feb. 26, 1988 which is a continuation in part of U.S. Ser. No. 07/089,146, filed Aug. 26, 1987, both of which are hereby incorporated by reference.

As shown in FIG. 6, a mechanism for transferring power directly from the engine crankshaft 76 to the input shaft 113 of the hydropump 112 is illustrated. The hydropump 112 is directly connected to the engine 70 through the cam shaft 130 which has a cam gear 170 operatively connected thereto. The cam shaft 130 is positioned intermediate and parallel to the engine crankshaft 76 and the hydrostatic pump input shaft 113. The cam gear 170 includes two separate portions 172, 174 each having teeth 176, 178. One of the cam gear portions 172 intermeshes with matching teeth 180 on the engine crankshaft 76 and the other cam gear portion 174 intermeshes with mating teeth 182 on a gear 184 carried by the hydrostatic pump input shaft 113. The shaft of the cam gear mechanism 130 includes the cam 131 and the cam gear 170, both of which are positioned inside the engine.

The driving or powering of the hydrostatic pump 112 by the cam gear mechanism 130, inside the engine 70, provides for increasing the distance between the end of engine crankshaft 76. The hydrostatic pump 112 and the engine crankshaft 76 are otherwise conventionally constructed.

This particular structure for powering the hydrostatic pump 112 which provides for the engine to be positioned closer relative to the ground also reduces the vehicle's center of gravity and thereby increases the vehicle's stability.

The speed reduction unit 108 is a planetary gear reduction type as is well known in the art. Planetary pinions 132 are meshed with and driven by an outer periphery of the circular sleeve portion 127 of the carrier 114 through ball bearings 116 and the inner teeth of a ring gear 134 are fixed to the axle housing 82 and are meshed with the outer teeth 133 of the planetary pinions 132. Splines are formed in the inner periphery of the boss portions of the planetary pinions 132. As shown, it is preferred that the planetary pinions 132 have one less tooth than the ring gear 134.

The differential unit 100 includes a tubular differential gear box 136 which is itself rotatably supported within the axle housing 82 by ball bearings 138. Operatively connected to the differential gear box 136 is an end shaft 140 support member. In the preferred embodiment, this member 140 is formed as an integral portion of the gear box 136. A pair of small bevel gears 142 are rotatably pivoted in the inner peripheral portion of the differential gear box 136. A pair of large bevel gears 144 engage the pair of small bevel gears 142 and are rotatably supported by the inner peripheries of the differential gear box 136 and the end shaft support member 140. Splines 146 are formed in an end portion of the end shaft support member 140. The splines 135 of the planetary pinion 132 are operatively connected to the splines 146 of the shaft by the axial hollow spline 150.

The axle unit also includes a long axle member 152 and a short axle member 154. The long axle member 152 is operatively connected at one end to an inner periphery of one of the large bevel gears 144 and projects at the other end from one side of the axle housing 82 passing through the hollow apertures of the carrier 114 and the spline 150. The other end of the long axle 152 is rotatably supported in the axle housing 82 by the needle bearings 120 and the ball bearings 158. The short axle 154 is connected to one end of the inner periphery of the other large bevel gear 144 through splines, is rotatably supported at the other end on the other side of the axle housing 82 by ball bearings 148 and projects to the outside. The drive wheels 64 are fixed to the projecting portions of the long and short axles 152 and 154 respectively.

In the preferred embodiment, to provide adequate belt clearance 80 under the transaxle housing 82, the diameter of the transaxle housing 82 is reduced as much as possible. The reduced central portion does not interfere with the revolution of the end portion on the planetary pinions 132 of the spline joints 135 since they are located to one end of the transaxle housing 82. At the same time, as shown in FIGS. 3 and 4, the axle housing center line x-x is located above a horizontal line through the centerline of axle y-y. Thus, the clearance or space 80 is formed which provides adequate clearance for the V-belt 74 which connects the engine 70 with the working implement 58 to operate and still provide adequate implement vertical float.

During the operation of the hydraulic motor 104, the working fluid which leaks therefrom, flows through the transaxle housing 82 into the chamber containing the differential unit 100, and is returned back to the variable hydraulic pump 112 through a return pipe 190. In the preferred embodiment, the fluid is returned to the engine sump 110 through internal means (not shown). The flow rate of the leakage of the hydraulic motor 104 to the differential unit 100 is increased due to the fluid diameter of the passage, i.e. the transaxle housing cross section, from that point over to the differential 144 being reduced. The working fluid is cooled by cooling fins (not shown) formed around the central portion as the fluid passes through the decreased diameter passage.

In operation, working fluid is supplied to the hydraulic motor 104 by the variable hydraulic pump 112 which is driven by the engine crankshaft 76. Rotation of the cylinder block 122 Causes the circular sleeve 127 of the carrier 114 to Concentrically rotate at the same rotational speed. Therefore, the planetary pinions 132 are meshed and revolve with the ring gear 134 so that the planetary pinions 132 are rotated about their own axes in the reverse direction to the revolution produced by the hydromotor 104. The rotational motion of the planetary pinions 132 is transmitted to the spline 150 which in turn drives the differential gear box 136, which in turn drives the small bevel gears 142 to drive the large bevel gears 144 and the shaft 152 which is splined to the gears 144. The crank shaft 76 causes the differential gear box 136 to rotate and also causes the long and short axles 152 and 154 to rotate through the engaged small and large bevel gears 142, 144, thus, rotating both the driving wheels 64. With the inclusion of the differential unit 100, when the vehicle is advanced slightly, the driving wheels 64 are rotated the same rotational speeds, but when the vehicle is advanced along a curved path, the drive wheel on the outside of the curve path is rotated at a higher speed than the other drive wheel on the inside of the curve path.

On the other hand, the crankshaft 76 of the engine 70 is operatively positioned to drive the implement input shaft through the belt pulley. The V-belt 74 and the belt pulley 86 are operatively connected to the working implement through the clearance or space 80 created by the selective positioning of the transaxle components. Thus, even if the front mounted implement is moved vertically in response to the vehicles traversing uneven ground which may have hills and such, the space and the transaxle through which the V-belt passes is of a sufficient width and height so that the V-belt will not interfere with the bottom surface of the transaxle housing.

With this construction, there is no need for the conventional intermediate shaft and the use of two belts, one from the engine to the intermediate shaft and the other from the intermediate shaft to the working implement. The result is significantly greater vertical float, decreased material manufacture and assembly cost and a lower vehicle center of gravity while maintaining adequate ground clearance for the engine output shaft 76.

While the method and operation herein described constitute preferred embodiments of the invention, it is to be understood that the invention is not limited to this precise method and operation, and the changes may be made therein without departing from the scope of the invention which is defined in the appended claims.

What is claimed is:

1. A work vehicle having wheels comprising:
   an engine having an output shaft;
   a transaxle for transmitting power from said engine to said wheels, said transaxle having an elongated housing interconnected with the engine, the housing including first and second spaced apart portions having a greater cross section than a third portion therebetween;
   speed reduction means carried in the first portion of said housing;
   differential means carried in the second portion of said housing;
   belt means operatively connectable with said output shaft of the engine and an implement means adapted for vertical float relative to the vehicle and having drive means located on the side of the transaxle opposite to said engine, for transmitting power from said engine to said implement means,
   said belt means when connected, passing by the third portion of the housing whereby the transaxle housing does not operationally interfere with said belt means as the implement means vertically floats.

2. A work vehicle of claim 1 wherein said belt means comprises:
   first pulley means operatively connected to said engine output shaft;
   second pulley means operatively connected to said implement means; and
   a single elastomeric belt operatively positioned in each of said pulley means so that the rotation of said output shaft rotates said first pulley means thereby rotating said second pulley means for transferring power to said implement means.

3. The work vehicle of claim 1 wherein a hydrostatic pump is operatively connected to said engine and a hydrostatic motor is operative positioned in the first portion of said transaxle housing, said pump being attached to said engine.

4. The work vehicle of claim 3 further comprising:
   a cam means operatively positioned inside said engine for transmitting power from said engine output shaft to said hydrostatic pump.

5. The work vehicle of claim 4 wherein said cam means further comprises:
   a cam shaft having teeth means operatively formed thereon; and
   a cam gear, operatively connected to said cam shaft, said cam gear having an upper and a lower portion each having teeth means for interacting with said engine output shaft and said hydrostatic pump.

6. The work vehicle of claim 5 wherein said upper portion of said cam gear interacts with said engine shaft and said lower portion of said cam gear interacts with an input shaft of said hydrostatic pump so that power is transmitted from said engine output shaft to said hydrostatic pump input shaft.

7. A unitized transaxle for powering the wheels of a work vehicle having an engine with a substantially vertical output shaft and hydraulic pump means powered by the engine, when belt means is used to operatively connect the drive means of a belt driven implement adapted for vertical float with the output shaft of the engine, the improvement comprising:
   a transaxle including an elongated housing operatively interconnected with said engine and located where it would be between the engine and drive means of said implement, said housing including first and second spaced apart portions having greater cross sections than a third portion therebetween;
   speed reduction means carried in the first portion;
   hydraulic motor means carried in the first portion and operatively connected to the said speed reduction means;
   differential means carried in the second portion of said housing; and
   tubular drive means extending between said speed reduction means and the differential means and passing through said third portion of the housing.

8. The unitized transaxle of claim 7 wherein said housing further comprises:
   a separate engine housing and
   a separate transaxle housing, said separate housings being operatively connected by bolt means to form a unitized combination.

9. A wheeled vehicle comprising:
   an engine having an output shaft;
   an elongated transaxle housing operatively positioned close to said engine, said housing including first and second spaced apart portions having a greater cross section than a third portion therebetween;
   speed reduction means carried in the first portion;

differential means carried in the second portion;
power transmission means extendable from the output shaft, adjacent to the third portion of said transaxle housing to be operatively connectable to the drive means of an implement which can be attached to said vehicle with its drive means spaced from the transaxle housing and located at the side of the transaxle housing opposite to said engine.

10. The invention defined in claim 9 wherein the housing means carries a first wheel axle in its first portion, a second wheel axle in its second portion with tubular drive means extending from and operatively interconnecting the speed reduction means with the differential means to drive said axles.

11. The invention defined in claim 9 wherein the engine output shaft is substantially vertical and the power transmission means is a V-belt interconnecting the output shaft with the implement drive means, said belt passing beneath the transaxle housing.

12. A work vehicle having drive wheels comprising:
an engine having a crankshaft with gear teeth means operatively connected thereto;
a transaxle having a housing with first and second spaced apart end portions, said transaxle operatively interconnected with said engine to form a unit for transmitting power from said engine to said wheels;
a hydrostatic pump operatively attached to said engine, said pump having an input shaft with gear teeth means;
a hydrostatic motor operatively positioned in the first portion of said transaxle housing;
an implement capable of vertical float relative to the vehicle, said implement being operatively connected to said vehicle and being located on the side of said transaxle opposite of said engine;
belt means operatively interconnecting said engine and said implement for transmitting power from said engine to said implement;
clearance means operatively formed in said transaxle, for allowing said belt means to pass by said transaxle so that said transaxle housing does not operationally interfere with said belt means before said belt means reaches a maximum vertical float;
cam means operatively positioned inside said engine for transmitting power from said engine crankshaft to said hydrostatic pump;
said cam means including a cam shaft having teeth means operatively formed thereon, a cam gear operatively connected with said cam shaft, said cam gear having an upper and a lower portion each having teeth means for interacting with said crankshaft gear teeth means and said hydrostatic pump input shaft gear teeth means;
one portion of said cam gear interacting with the crankshaft and the other portion of said cam gear interacting with said hydrostatic pump input shaft so that power is transmitted from said engine crankshaft to said hydrostatic pump input shaft.

13. An engine transaxle combination for powering a work vehicle having an implement capable of vertical float relative to the vehicle attachable thereto, said combination comprising:
an engine having a crankshaft with gear teeth means operatively connected thereto;
a transaxle including an elongated housing means operatively interconnected with said engine to form at least a partially unitized assembly, said housing means having spaced apart ends;
a hydrostatic motor operatively positioned in said transaxle housing means relatively closer to one end thereof;
a speed reduction unit operatively positioned in said transaxle housing means relatively close to said hydrostatic motor;
a differential unit operatively positioned in said transaxle housing means relatively closer to the other end thereof so that a narrow section is formed in said housing means between the differential unit and said hydrostatic motor and said speed reduction unit;
a hydrostatic pump having an input shaft operatively connected to said engine, said shaft having gear teeth means;
means for providing fluid between said hydrostatic pump and said hydrostatic motor; and
cam means operatively positioned inside said engine for transmitting power from said engine crankshaft to said hydrostatic pump, said cam means including a cam shaft having gear means operatively connected thereto, said gear means having an upper and a lower portion, said portions having teeth means for interaction with said crankshaft gear teeth means and said hydrostatic pump input shaft teeth means, one portion of said cam gear means interacting with said crankshaft and the other portion of said cam gear means interacting with said hydrostatic pump input shaft so that power is transmitted from said engine crankshaft to said hydrostatic pump input shaft.

14. The combination including a wheeled vehicle, adapted to support a work implement capable of vertical float relative to the vehicle, and having drive means;
an engine carried on the vehicle and having an output shaft;
an elongated transaxle housing carried by the vehicle and operatively positioned between the engine and the implement, said transaxle housing including first and second spaced apart portions having a greater cross section than a third portion therebetween;
axle means carried within the transaxle housing and operatively coupled to the vehicle wheels;
power transmission means coupled with and extending from the output shaft of the engine, between the first and second portions, adjacent to the third portion of the transaxle housing, and coupled to the drive means of the implement for drivingly powering the implement as it encounters vertical float relative to said vehicle.

15. The invention as defined in claim 14 wherein speed reduction means is carried in the first portion and differential means is carried in the second portion of said transaxle.

16. The invention defined in claim 15 wherein hydraulic motor means is further carried in the first portion and operatively connected to the speed reduction means.

17. The invention defined in claim 15 wherein tubular drive means extends between the speed reduction means and the differential means, said tubular drive means passing through the third portion of the housing.

18. The invention as defined in claims 15, 16 or 17 wherein the power transmission means includes a V-belt extending between the engine shaft and implement.

* * * * *

UNITED STATES PATENT AND TRADEMARK OFFICE
CERTIFICATE OF CORRECTION

PATENT NO. : 4,969,319

DATED : 13 November 1990

INVENTOR(S) : Wayne R. Hutchison et al.

It is certified that error appears in the above-identified patent and that said Letters Patent is hereby corrected as shown below:

Title page, item [73] change "Deere & Company, Moline, Ill."
to --Deere & Company, Moline, Ill. and Kawasaki Heavy Industries, LTD., Tokyo, Japan.--

Signed and Sealed this

First Day of March, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 4,969,319
DATED : 13 November 1990
INVENTOR(S) : Wayne R. Hutchison et al.

It is certified that error appears in the above-indentified patent and that said Letters Patent is hereby corrected as shown below:

On the title page, Item [73]:
Please change assignee from "Deere & Company, Moline, Ill." to
--Deere & Company, Moline, Ill. and Kawasaki Jukogyo Kabushiki
Kaisha, Kobe, Japan--

Signed and Sealed this

Twelfth Day of April, 1994

*Attest:*

BRUCE LEHMAN

*Attesting Officer*

*Commissioner of Patents and Trademarks*